(No Model.)
W. LAKE.
COUPLING FOR UNDERGROUND CONDUITS.
No. 403,352. Patented May 14, 1889.
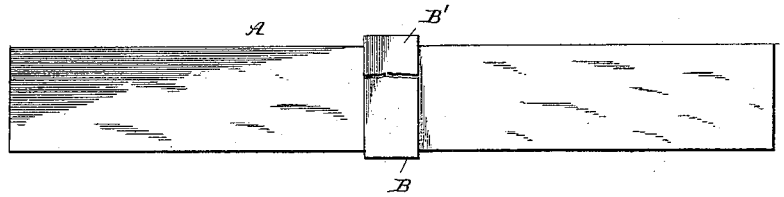
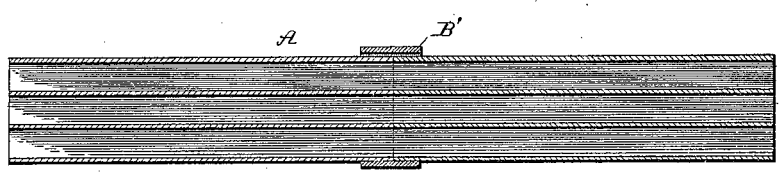
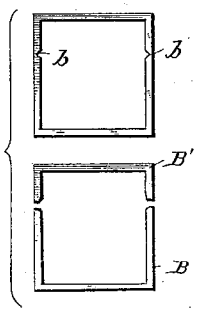
Witnesses
Edwin L. Bradford
Wm. M. Stockbridge
Inventor
Wilmot Lake
By his Attorneys
V. D. Stockbridge + Dumont

UNITED STATES PATENT OFFICE.

WILMOT LAKE, OF WASHINGTON, DISTRICT OF COLUMBIA.

COUPLING FOR UNDERGROUND CONDUITS.

SPECIFICATION forming part of Letters Patent No. 403,352, dated May 14, 1889.

Application filed October 2, 1888. Serial No. 286,985. (No model.)

*To all whom it may concern:*

Be it known that I, WILMOT LAKE, a citizen of the United States, residing at Washington, in the District of Columbia, have invented certain new and useful Improvements in Couplings for Underground Conduits; and I do hereby declare the following to be a full, clear, and exact description of the invention, such as will enable others skilled in the art to which it appertains to make and use the same.

My invention relates to improvements in underground electric-wire conduits and in couplings for the same.

The invention consists of a two-part coupling for underground electric-wire conduits, made in the form of a collar or sleeve for holding the ends of perforated conduit-sections from displacement and so that the perforations will register with each other.

This coupling is rectangular in form, and is scored or grooved on the opposite sides, preferably in the same horizontal plane, so that when required for use it may be readily separated by the blow of a trowel or other instrument.

In the drawings forming a part of this specification, Figure 1 is a side elevation of a conduit with the coupling applied. Fig. 2 is a section of the conduit and coupling. Fig. 3 is an end view of the coupling before being applied to use and after it has been broken by a trowel or other instrument.

A is a section of a rectangular terra-cotta conduit-section having rectangular partitions and having its surface glazed with vitreous material.

B is the lower segment of the coupling, and B' the cap or upper part.

The coupling is molded in a well-known way with the scores or grooves $b\ b$. These scores or grooves are for the purpose of providing an initial fracture to determine the place and direction of the same when it is desired to separate the parts for use.

The sections of terra-cotta conduit ordinarily weigh one hundred pounds, more or less, and have to be handled singly, and their joints, which must be impervious to water, have to be completed in the trench made for the conduit. In order to make and seal these joints conveniently, the coupling must be separated and the lower segment adjusted in the trench before the conduit-section is placed therein. The lower segments constitute sockets for the conduit-sections, to cause the cells or perforations to register and to hold the sections in proper relation with each other. When the open socket or lower coupling-segment is in position, plastic hydraulic cement is spread near the end edges of the coupling, after which the conduit-sections are adjusted in position in the sockets end to end. In this way the under side of the joint is made impervious to water. After the conduit-sections have been adjusted in position the top sections, B', of the coupling are put in place and the joint between the parts of the coupling and between them and the conduit are luted with hydraulic cement, and thereby rendered water-tight.

Obviously the two parts of the coupling can be made to match each other better, and they can be made cheaper when made integral with each other than if made separately. Moreover, the two parts tend to sustain and protect each other from breakage in handling before required for use.

Having thus described my invention, what I claim is—

A terra-cotta coupling for electric-wire conduits, consisting of a short rectangular band, collar, or sleeve scored or grooved on opposite sides, substantially as and for the purposes described.

In testimony whereof I affix my signature in presence of two witnesses.

WILMOT LAKE.

Witnesses:
R. H. COWAN,
CHAS. W. DARR.